United States Patent
Chen

(10) Patent No.: US 8,246,476 B2
(45) Date of Patent: Aug. 21, 2012

(54) UNIVERSAL JOINT

(75) Inventor: Chia-Yi Chen, Taichung Hsien (TW)

(73) Assignee: Yuan Li Hsing Industrial Co., Ltd., Taichung Hsien (TW)

( * ) Notice: Subject to any disclaimer, the term of this patent is extended or adjusted under 35 U.S.C. 154(b) by 188 days.

(21) Appl. No.: 12/801,314

(22) Filed: Jun. 3, 2010

(65) Prior Publication Data

US 2011/0256938 A1 Oct. 20, 2011

(30) Foreign Application Priority Data

Apr. 19, 2010 (TW) .............................. 99112214 A

(51) Int. Cl.
*F16D 3/20* (2006.01)
(52) U.S. Cl. .................... 464/141; 464/901; 464/906
(58) Field of Classification Search .................. 464/139, 464/141–143, 901, 906; 81/177.75; 403/90, 403/91, 100–102, 137, 138, 144, 83, 84, 403/103, 106, 114, 115
See application file for complete search history.

(56) References Cited

U.S. PATENT DOCUMENTS

| | | | | |
|---|---|---|---|---|
| 1,838,310 A | * | 12/1931 | Hubbel | 464/141 |
| 2,653,456 A | * | 9/1953 | Heym | 464/141 |
| 3,107,504 A | * | 10/1963 | Koss | 464/141 |
| 3,107,505 A | * | 10/1963 | Koss | 464/141 |
| 4,832,657 A | * | 5/1989 | Hahn | 464/141 |
| 6,152,826 A | | 11/2000 | Profeta et al. | |
| 6,869,366 B2 | | 3/2005 | Delaney et al. | |
| 7,278,342 B1 | * | 10/2007 | Chang | 81/177.75 |
| 2004/0214646 A1 | * | 10/2004 | Chiou | |
| 2006/0234799 A1 | * | 10/2006 | Chiou | |
| 2009/0288523 A1 | | 11/2009 | Chen | |
| 2011/0030517 A1 | * | 2/2011 | Peng | |

OTHER PUBLICATIONS

"Circlip." Dirac Delta. May 21, 2006, [online], [retrieved on Jan. 31, 2012] Retrieved from the Internet <URL:http://web.archive.org/web/20060521024457/http://www.diracdelta.co.uk/science/source/c/i/circlip/source.html>.*

* cited by examiner

*Primary Examiner* — Gregory Binda
*Assistant Examiner* — Josh Skroupa
(74) *Attorney, Agent, or Firm* — Bacon & Thomas, PLLC

(57) ABSTRACT

A universal joint composed of a swivel member, a driven socket, and at least one mediator. The swivel member includes a swivel body and a first driving portion. The driven socket includes a concavity, a second driving portion, and an annular recess formed at the concavity. A retaining ring is mounted in the annular recess. The swivel body is received in the concavity. The swivel body includes at least one cavity formed on a surface thereof. The driven socket includes at least one recession, which can correspond to the at least one cavity when the swivel body is located in the concavity. The at least one mediator interacts with the recession and the cavity and is located between the swivel body and the driven socket. Therefore, the operation of the universal joint can be smooth.

13 Claims, 5 Drawing Sheets

UNIVERSAL JOINT

BACKGROUND OF THE INVENTION

1. Field of the Invention

The present invention relates generally to a hand tool, and more particularly, to a universal joint for a hand tool.

2. Description of the Related Art

Most of the conventional universal joints each are composed of two components. For example, U.S. Patent Laid-open No. 2009/0288523 disclosed a universal joint composed of a rod, a polyhedral sphere, and a socket having a polyhedral cavity for receiving and engaging the polyhedral sphere. The cavity includes a groove formed at an opening thereof for a restraining element to fit therein in such a way that the polyhedral sphere can be restrained within the cavity. When this universal joint is used, the polyhedral engagement between the polyhedral cavity and the polyhedral sphere can prevent the polyhedral sphere from axial rotation with respect to the cavity, and the polyhedral sphere can pivot within a predetermined range for a predetermined angle. However, when the rod is operated to pivot, the surfaces of the polyhedral sphere are slidably moved with respect to the internal surfaces of the polyhedral cavity while keeping in contact with the internal surfaces of the cavity, such that the operation is not smooth.

In addition, U.S. Pat. No. 6,869,366 disclosed that a driven socket 14 includes a plurality of channels 32 formed at a bottom end thereof, and a driver 12 located below the driven socket 14 and having a plurality of inwardly extending protrusions 52 corresponding to the channels 32. In this way, the driver 12 can be forced to pivot universally with respect to the driven socket 14 without axial rotation. Besides, the proprietor of this patent has another U.S. Pat. No. 6,152,826, which has the similar structure and the same effect.

In the above two patents, the channels 32 are used for engaging the inwardly extending protrusions 52 for the universal jointure. However, in the actual operation, when the driver is pivoted with respect to the driven socket, the channels 32 can be moved limitedly within the inwardly extending protrusions 52. As can be seen from this, the inwardly extending protrusions 52 each must have a predetermined length for the stroke of the channels 32. In other words, the driven socket must have sufficient length to receive the inwardly extending protrusions. However, such structure makes the whole universal joint larger to increase the production cost.

SUMMARY OF THE INVENTION

The primary objective of the present invention is to provide a universal joint, which facilitates the operation.

The secondary objective of the present invention is to provide a universal joint, which size is smaller than that of the prior art.

The foregoing objectives of the present invention are attained by the universal joint composed of a swivel member, a driven socket, and at least one mediator. The swivel member includes a swivel body formed at a bottom end thereof, and a first driving portion formed at top end thereof. The driven socket includes a concavity formed at a top end thereof, a second driving portion formed at a bottom end thereof, and an annular recess formed on an upper part of a peripheral wall of the concavity. A retaining ring is mounted in the annular recess. The swivel body is received in the concavity. The swivel body includes at least one cavity formed on a surface thereof and recessed downward from a surface of one side thereof. The driven socket includes at least one recession, which can correspond to the at least one cavity when the swivel body is located in the concavity. The at least one mediator interacts with the recession and the cavity and is located between the swivel body and the driven socket. Therefore, the operation of the universal joint can be smooth.

DETAILED DESCRIPTION OF PREFERRED EMBODIMENTS

Figure 1:
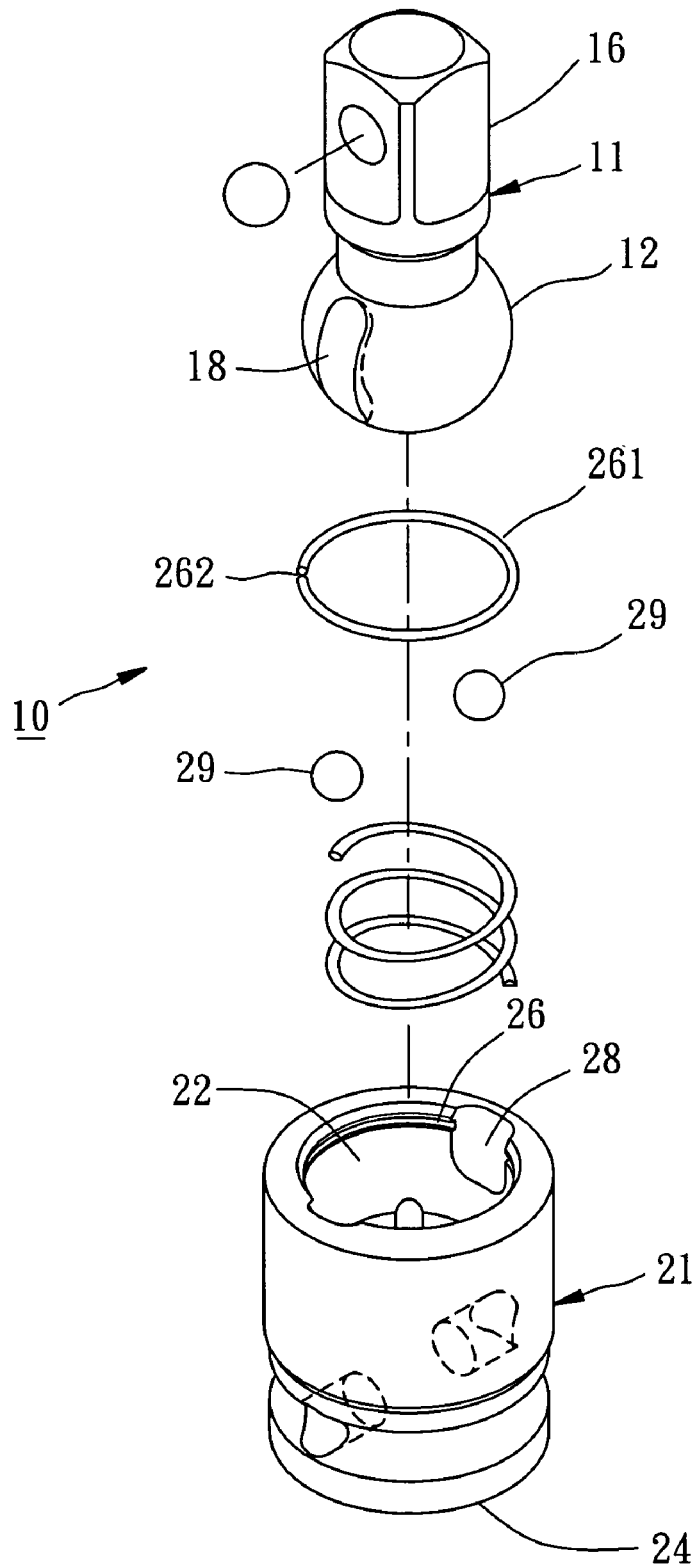
FIG. 1 is an exploded view of a first preferred embodiment of the present invention.
Figure 2:
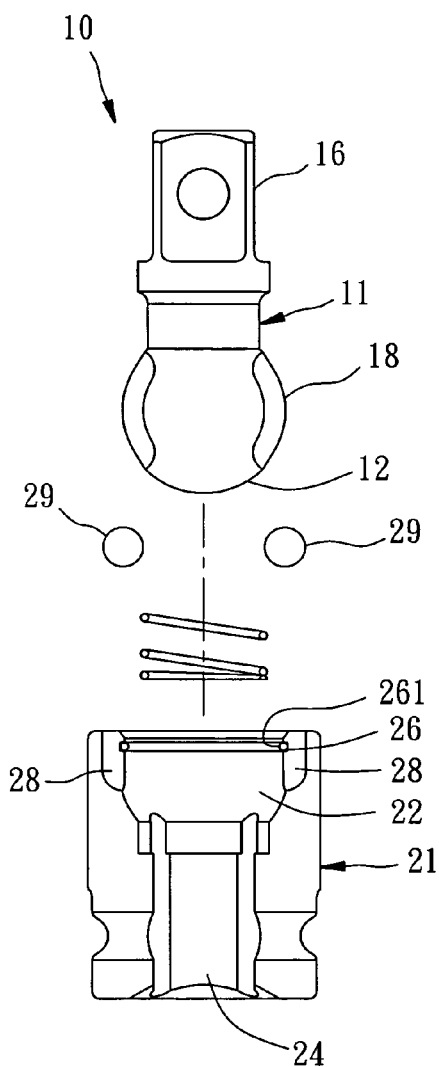
FIG. 2 is a sectional view of the first preferred embodiment of the present invention, illustrating that the swivel member and the driven socket are separate from each other.
Figure 3:
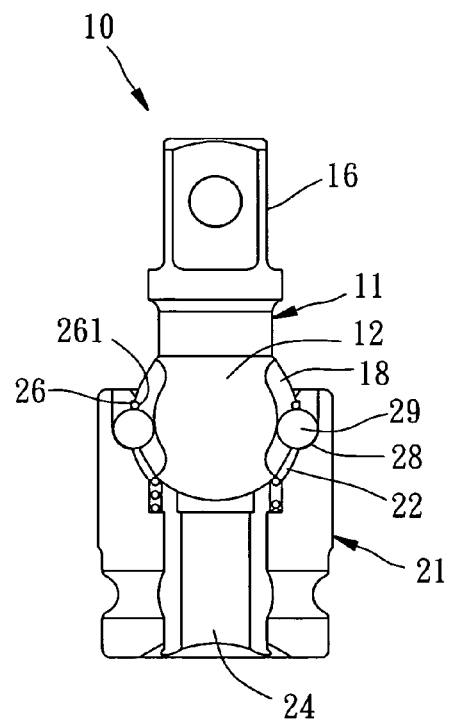
FIG. 3 is another sectional view of the first preferred embodiment of the present invention, illustrating that the swivel member and the driven socket are separate from each other.

Referring to FIGS. 1-3, a universal joint 10 constructed according to a first embodiment of the present invention is composed of a swivel member 11, a driven socket 21, and a plurality of mediators 29. The detailed descriptions and operations of these elements as well as their interrelation are recited in the respective paragraphs as follows.

The swivel member 11 includes a swivel body 12 formed at a bottom end thereof, and a first driving portion 16 formed at a top end thereof. The swivel body 12 is a sphere in this embodiment.

The driven socket 21 includes a concavity 22 formed at a top end thereof, a second driving portion 24 formed at a bottom end thereof, and an annular recess 26 formed at an upper part of a peripheral wall of the concavity 22. A retaining ring 261 is mounted in the annular recess 26. The swivel body 12 is received in the concavity 22 and restrained by the retaining ring 261 from disengaging from the driven socket 21. In this embodiment, the retaining ring 261 includes a gap 262 to be C-shaped; alternatively, the retaining ring 261 can be squeezed straight into the annular recess 26 without the gap 262.

The swivel body 12 includes a plurality of cavities 18 formed on a surface thereof. There are two cavities 18 in this embodiment and they are mounted to a lateral side of the swivel body 12 with a predetermined interval formed therebetween. Each of the cavities 18 extends downward from a lateral side of the swivel body 12.

The driven socket 21 includes a plurality of recessions 28 (two recessions in this embodiment) formed on the sidewall of the concavity 22. When the swivel body 12 is mounted to the concavity 22, the recessions 28 can correspond to the cavities 18 respectively. In this embodiment, the recessions 28 overlap the annular recess 26 and the annular recess 26 is located at an upper part of each of the recessions 28.

Figure 4:
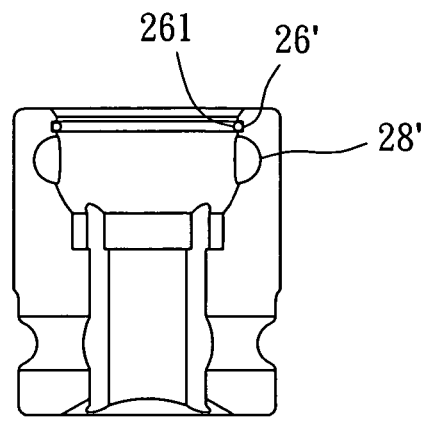
FIG. 4 is a sectional view of a part of the first preferred embodiment of the present invention.

Referring to FIG. 4, the annular recess 26' can be alternatively mounted above the recession 28', likewise allowing the retaining ring 261 to restrain the swivel body 12.

In this embodiment, each of the mediators 29 is a rolling ball and there are two rolling balls, each of which is installed in one of the recessions 28 and one of the cavities 18 to be located between the swivel body 12 and the driven socket 21.

When the universal joint 10 is intended for operation, a user can fit the first and second driving portions 16 and 24 with a tool (not shown) and a workpiece (not shown; e.g. a screw nut) respectively. Operating the tool can turn the swivel member 11 to drive the driven socket 21 to rotate the workpiece in such a way that the universal joint 10 can function as an adapter for the universal juncture. How the swivel member 11 and the driven socket 21 are connected with the tool and the workpiece respectively belongs to the prior art, such that no more drawing is required in this regard.

Figure 5:
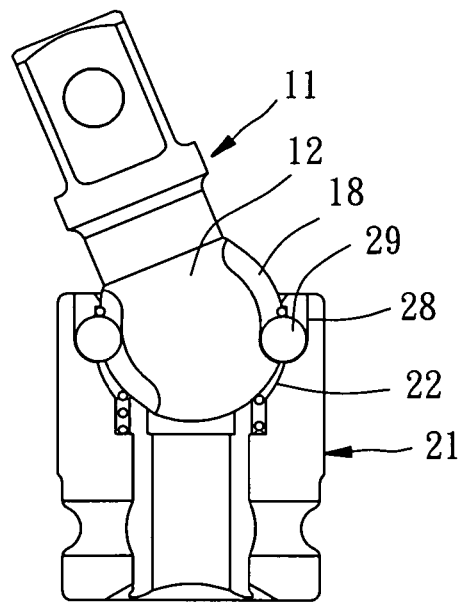
FIG. 5 is a sectional view of the first preferred embodiment of the present invention, illustrating that the annular recess is located above the recession.

When the rotary operation is intended, referring to FIG. 5, the user can pivot the swivel member 11 for a predetermined angle with respect to the driven socket 21. During the pivoting movement of the swivel member 11, the rolling of the mediators 29 located between the recessions 28 and the cavities 18 facilitates the pivoting movement of the swivel body 12 with respect to the driven socket 21. Besides, when the swivel member 12 is forced to pivot, the swivel member 12 can pivot toward the direction of the force applied to the swivel member 12 along the cavities 18 or the paths of the mediators 29, rather than freely pivoting within the concavity 22 along the axial direction of the swivel member 11. In other words, the swivel member 11 can only freely pivot with respect to the driven socket 21 rather than pivoting axially with respect to the driven socket 21. In this way, when the swivel member 11 is forced to pivot, the driven socket 21 can be rotated at the same time for universal jointure.

It is to be noted that the mediators 29 are rolling balls as an example only and can be any alternative, like non-circular objects, which should also fall in the scope of the present invention.

Figure 6:
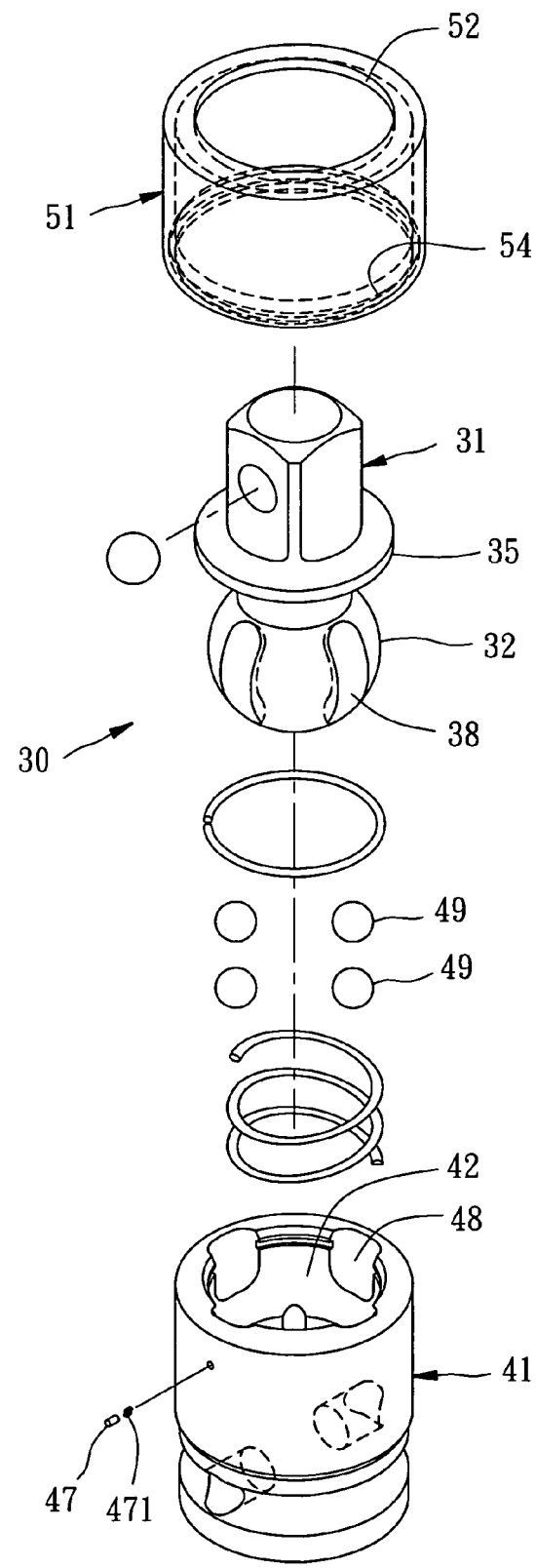
FIG. 6 is an exploded view of a second preferred embodiment of the present invention.
Figure 7:
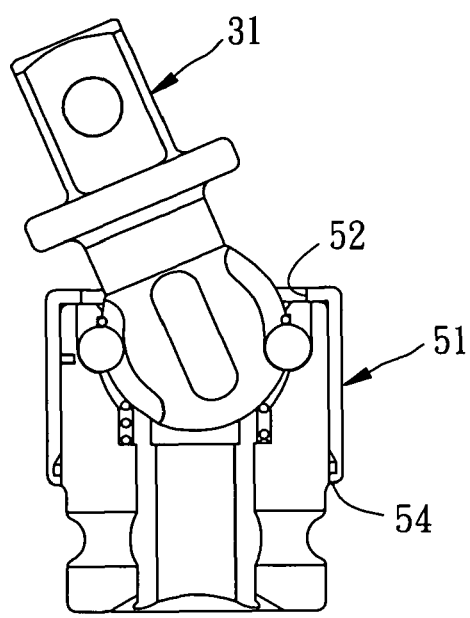
FIG. 7 is another sectional view of the second preferred embodiment of the present invention, illustrating that the sleeve is located at the first position.
Figure 8:
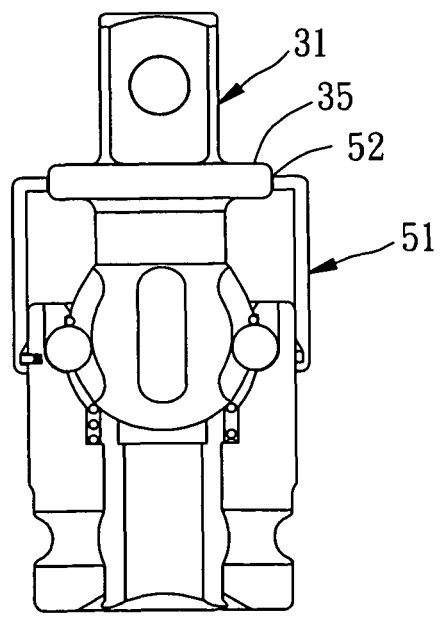
FIG. 8 is another sectional view of the second preferred embodiment of the present invention, illustrating that the sleeve is located at the second position.

Referring to FIGS. 6-8, a universal joint 31 constructed according to a second embodiment of the present invention is similar to that of the first embodiment, having the following differences recited below.

The universal joint 31 includes a sleeve 51 movably sleeved onto the driven socket 41 and can be moved between a first position (FIG. 7) and a second position (FIG. 8). The sleeve 51 has an annular retaining fringe 52 extending inwardly from a top end thereof for a predetermined width. The diameter of the annular retaining fringe 52 is smaller than that of the concavity of the driven socket 41.

The swivel member 32 includes four cavities 38. The driven socket 41 includes four recessions 48 corresponding to the four cavities 38 respectively. There are also four mediators 29 located to correspond to the cavities 38 and the recessions 48.

The swivel member 32 includes an annular convexity 35. The diameter of the retaining fringe 52 is larger than that of the annular convexity 35. When the sleeve 51 is located at the second position, the retaining fringe 52 is located around the annular convexity 35 and stops the swivel member 32 from pivoting movement.

When the sleeve 51 is located at the first position, the retaining fringe 52 is stopped downwardly against a top periphery of the concavity 42 of the driven socket 41. When the sleeve 51 is located at the second position, the retaining fringe 52 is located around the swivel member 32 to prevent the swivel member 32 from any pivoting movement.

The driven socket 41 includes a stopper 47 formed on an external surface thereof. The stopper 47 can be forced by a spring 471 to bounce outwardly for a predetermined length. The sleeve 51 includes an annular dentation 54 formed on an internal bottom side thereof. When the sleeve 51 is located at the second position, the stopper 47 is stopped against the annular dentation 54 to prevent the sleeve 51 from upward movement and further disengagement from the driven socket 41.

As similar to the first embodiment, the swivel member 32 can pivot with respective to the driven socket 41 without axial rotation along with the driven socket 41. When the sleeve 51 of the second embodiment is located at the first position as shown in FIG. 7, the swivel member 32 cannot be stopped and thus can be operated as in the first embodiment. When the sleeve 51 of the second embodiment is located at the second position as shown in FIG. 8, the retaining fringe 52 is located around the annular convexity 35 to prevent the swivel member 32 from pivoting movement, such that the universal joint 31 is not pivotable at that time.

In addition, as can be seen from FIG. 6 and the second embodiment, upper parts of the cavities 38 are relatively closer to each other and middle parts of the cavities 38 are relatively farther to each other. When the swivel member 32 pivots with respect to the driven socket 41 and the mediators 49 are moved to the upper parts of the cavities, the mediators 40 are moved close to each other. In the meantime, the widest part of the recession 48 is wider than that of the mediator 49, such that the recessions 48 allow the mediators 49 to move closer to each other and the swivel member 32 cannot be difficultly operated or jammed.

It is to be noted that it is just an example for that the widest part of the recession 48 is wider than that of the mediator 49; there can be other alternative examples, e.g. the widest part of the cavity 38 is wider than that of the mediator 49; the widest part of each of the cavity 38 and the recessions 48 is wider than that of the mediator 49. All of such and other examples fall in the scope of the present invention.

In conclusion, the present invention includes the following advantages.

1. The mediators mounted between the swivel member and the driven socket can be the media of the pivoting movement of the swivel member with respect to the driven socket and interact with the recessions and the cavities, thus facilitating the operation of the pivoting movement of the swivel member.

2. The recessions do not need to be long as long as the mediators roll within the recessions, such that the whole size of the universal joint can be smaller than the prior art.

3. The sleeve of the second embodiment can allow the user to optionally prevent the swivel member from pivoting movement or enable the swivel member to freely pivot.

Although the present invention has been described with respect to specific preferred embodiments thereof, it is in no way limited to the specifics of the illustrated structures but changes and modifications may be made within the scope of the appended claims.

What is claimed is:

1. A universal joint comprising:
   a swivel member having a swivel body and a first driving portion, the swivel body being formed at a bottom end of the swivel member and having at least one cavity formed at a surface thereof, the at least one cavity extending downwardly from a lateral side of the swivel body, the first driving portion being formed at a top end;
   a driven socket having a concavity formed at a top end thereof, a second driving portion formed at a bottom end thereof, an annular recess formed at an upper part of a peripheral wall of the concavity, and at least one recession formed at the peripheral wall of the concavity and corresponding to the at least one cavity of the swivel body, a retaining ring being formed in the annular recess, the swivel body being received in the concavity;

at least one mediator interacting with the at least one recession and the at least one cavity and located between the swivel body and the driven socket; and further comprising a sleeve, wherein the sleeve is movably sleeved onto the driven socket and can be moved between a first position and a second position, the sleeve having a retaining fringe formed at a top end thereof; when the sleeve is located at the second position, the retaining fringe is located around the swivel member to prevent the swivel member from pivoting movement.

2. The universal joint as defined in claim 1, wherein the annular recess is located above the at least one recession.

3. The universal joint as defined in claim 1, wherein the at least one recession overlaps the annular recess; the annular recess is located at an upper part of each of the at least one recession.

4. The universal joint as defined in claim 1, wherein the retaining ring comprises a gap to be C-shaped.

5. The universal joint as defined in claim 1, wherein the at least one cavity is plural in number and the cavities are spaced in an interval and mounted to the lateral side of the swivel body; the at least one recession is plural in number and the recessions correspond to the cavities respectively; the at least one mediator is plural in number and each of the mediators interacts with one of the recessions and one of the cavities to be located between the swivel body and the driven socket.

6. The universal joint as defined in claim 5, wherein the widest part of each of the cavities is wider than that of one of the mediators.

7. The universal joint as defined in claim 5, wherein the widest part of each of the recessions is wider than that of one of the mediators.

8. The universal joint as defined in claim 5, wherein the widest part of each of the cavities and recessions is wider than that of one of the mediators.

9. The universal joint as defined in claim 1, wherein each of the at least one mediator is a rolling ball.

10. The universal joint as defined in claim 1, wherein the retaining fringe extends inwardly for a predetermined width from a top end of the sleeve, the retaining fringe having a diameter smaller than that of the concavity; when the sleeve is located at the first position, the retaining fringe is downwardly stopped against a top periphery of the concavity.

11. The universal joint as defined in claim 10, wherein the sleeve comprises an annular dentation formed at an internal surface thereof; the driven socket comprises a stopper formed at an external surface thereof; when the sleeve is located at the second position, the stopper is stopped against the annular dentation.

12. The universal joint as defined in claim 11, wherein the stopper is mounted to the driven socket and can be forced by spring to bounce outwardly for a predetermined length.

13. The universal joint as defined in claim 1, wherein the swivel member comprises an annular convexity; the retaining fringe of the sleeve has a diameter larger than that of the annular convexity; when the sleeve is located at the second position, the retaining fringe is located around the annular convexity to prevent the swivel member from pivoting movement.

\* \* \* \* \*